United States Patent
Kessler

(10) Patent No.: US 7,104,940 B2
(45) Date of Patent: Sep. 12, 2006

(54) TOOL CHANGER FOR A MACHINE TOOL

(75) Inventor: Kurt Kessler, München (DE)

(73) Assignee: DECKEL MAHA Geretsried GmbH, Geretsried (DE)

( * ) Notice: Subject to any disclaimer, the term of this patent is extended or adjusted under 35 U.S.C. 154(b) by 81 days.

(21) Appl. No.: 10/489,127

(22) PCT Filed: Sep. 10, 2002

(86) PCT No.: PCT/EP02/10138

§ 371 (c)(1), (2), (4) Date: Aug. 20, 2004

(87) PCT Pub. No.: WO03/022515

PCT Pub. Date: Mar. 20, 2003

(65) Prior Publication Data

US 2004/0259705 A1 Dec. 23, 2004

(30) Foreign Application Priority Data

Sep. 10, 2001 (DE) .......................... 201 14 908 U

(51) Int. Cl.
B23Q 3/157 (2006.01)
B66C 1/42 (2006.01)

(52) U.S. Cl. .......................... 483/39; 483/40; 483/41; 294/99.1; 294/103.1

(58) Field of Classification Search .................. 483/39, 483/36, 37, 38, 40, 41, 44, 45, 46, 47, 48, 483/57, 901, 902, 23, 1; 294/99.1, 103.1
See application file for complete search history.

(56) References Cited

U.S. PATENT DOCUMENTS

| 4,221,043 | A | * | 9/1980 | Dailey ......................... 483/44 |
| 4,288,192 | A | * | 9/1981 | Geiger et al. ................. 483/44 |
| 4,306,350 | A | * | 12/1981 | Kielma et al. ................. 483/1 |
| 4,648,171 | A | * | 3/1987 | Yasukawa ....................... 483/1 |
| 4,884,332 | A | * | 12/1989 | Ozawa et al. ................. 483/44 |
| 5,188,579 | A | * | 2/1993 | Ruschle et al. ................ 483/1 |
| 5,267,766 | A | | 12/1993 | Geissler |
| 5,649,887 | A | | 7/1997 | Taki et al. |
| 5,908,374 | A | * | 6/1999 | Kato ........................... 483/39 |
| 6,773,382 | B1 | * | 8/2004 | Kato ........................... 483/39 |
| 6,846,276 | B1 | * | 1/2005 | Yasumatsuya et al. ......... 483/1 |
| 2002/0094920 | A1 | * | 7/2002 | Yasumatsuya et al. ......... 483/1 |

FOREIGN PATENT DOCUMENTS

| DE | 24 10 444 A1 | 2/1975 |
| DE | 3531 160 A1 | 3/1987 |
| DE | 37 17201 A1 | 12/1988 |
| DE | 42 15697 A1 | 11/1993 |
| JP | 60048234 | 3/1985 |

* cited by examiner

Primary Examiner—Monica Carter
Assistant Examiner—Dana Ross
(74) Attorney, Agent, or Firm—The Maxham Firm

(57) ABSTRACT

A tool changer for machine tools having at least two tong-shaped grippers, the legs of which are formed for engaging with the ring groove at a broader end of a tool taper. The grippers are symmetrically mounted about the central axis of a carrier and are rotatable around the central axis with their legs pointing outward. The carrier is mounted on a support structure that has a drive for moving the carrier. In order to enable an earlier release of the tool taper from the collet chuck in the work spindle, and thus faster tool changes, at least one leg of the grippers is extended to form a protruding holding finger.

10 Claims, 2 Drawing Sheets

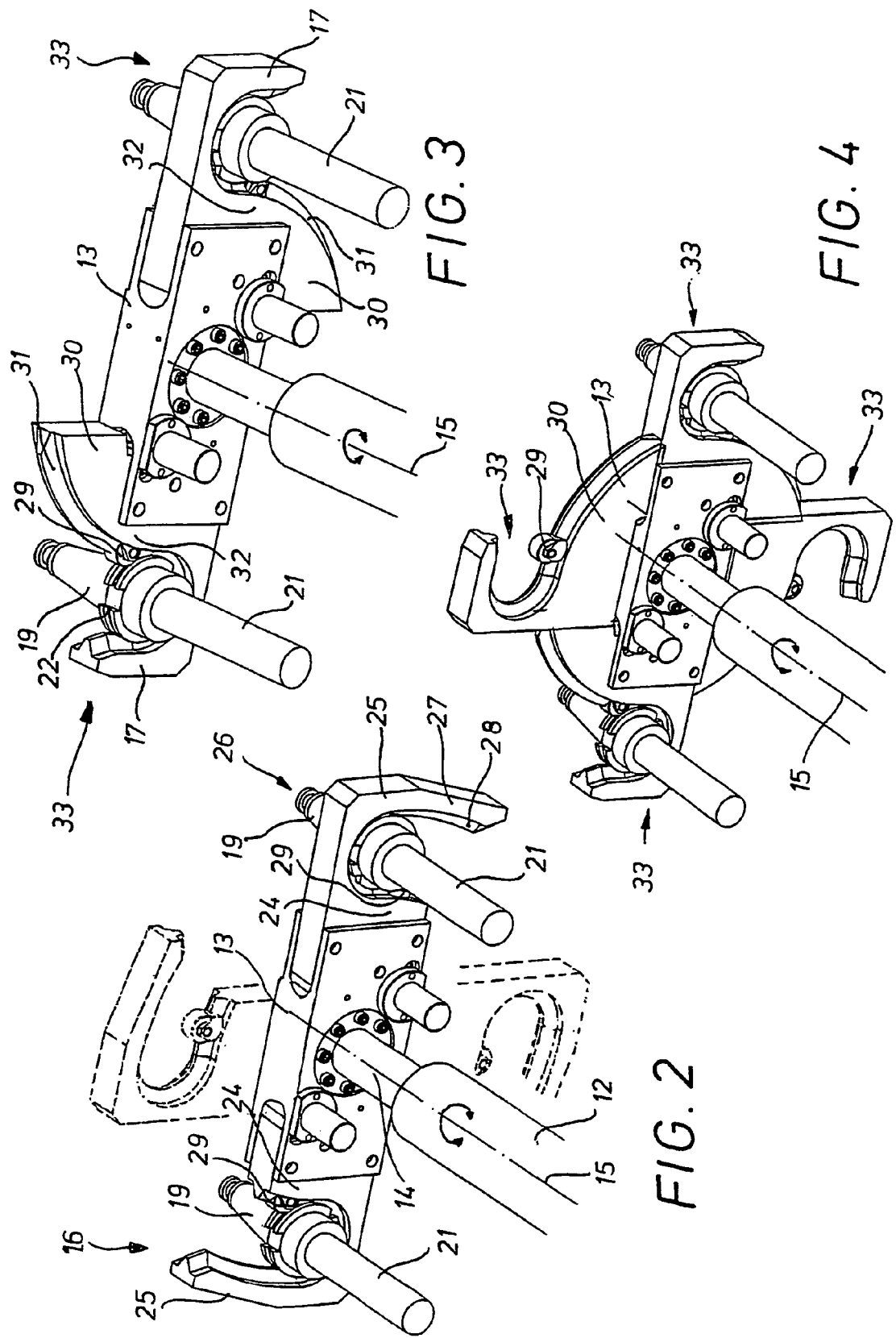

TOOL CHANGER FOR A MACHINE TOOL

BACKGROUND OF THE INVENTION

1. Field of the Invention

The present invention relates generally to machine tools, and more specifically to tool changers for machine tools.

2. Discussion of Related Art

Typically, tool changing systems are used in modern program-controlled machine tools. They serve to transfer tools between a tool magazine and the vertical or horizontal work spindle of the machine tool. Certain components of the tool changers, including their tong-shaped grippers, move on predefined tracks to receive the selected tools in predetermined changing positions. Using their tongs, the grippers can laterally grip a ring groove on the tool taper when the tool is located at the changing position of the magazine. The tool is taken out of the magazine by a pull-off movement. The tool is brought into a position where a rotary or swiveling motion of the tool changer may effect the exchange of the tool into the work spindle. The changing process of a "used" tool from the work spindle to an open space in the tool magazine is carried out in reverse functional sequence.

German patent publication DE 35 31 160 A1 describes a tool changer for a machine tool. The gripper approaches the flange of a tool taper laterally with two legs that are movable in opposite directions. The legs can be locked by means of a device after surrounding the tool taper. This protects the tool taper in the gripper from being pulled out. A connecting link provided on the machine tool pushes the locking element axially out of the flange's range on the tool taper when the gripper is moved in front of the tool holding fixture.

German patent publication DE 42 15 697 A1 describes another tool changer for machine tools. The gripper of this device is arranged on a changer arm movably formed between the tool magazine and the tool receiving position of the work spindle. The changer arm carries two grippers arranged side by side, which in their initial position are disposed parallel to the axis of a spindle for holding tools. The two grippers are connected to the changer arm by a swivel device and can be shifted synchronously in parallel and relative to the spindle axis in the direction of a connecting line between both grippers.

Furthermore, German patent publication DE 37 17 201 A1 describes a gripper for tools of a machine tool, where two movable jaws provide for positive engagement with the groove of a tool taper. In order for the gripper legs to positively engage the groove on the thickened end of the tool taper, the gripper is provided with a movable operating element. This element moves the legs to an expanded position for introducing the tool taper, and to a closed position for positively gripping the tool taper. This operating element is operated by a stationary stop of the machine tool. Furthermore, the gripper has two fixed jaws arranged co-axially with the two gripper legs. The jaws project beyond the ends of the gripper legs. Both jaws gradually merge into a common semi-circular holding fixture where a centering groove is formed. However, the use of movable gripper legs and additional fastened jaws for each gripper is technically expensive and offers risk of malfunction.

In modern milling and boring centers for the industrial scale manufacture of tools, the essential operating times with a single tool are often within a range of seconds. Tool changing after each machining process takes a few seconds. This results in a relatively unfavorable ratio between the total operating time and the time required for the corresponding tool changing. The production yield of the machine is thereby affected. This ratio of chip-to-chip and operating time becomes even more unfavorable if heavy-duty spindles, for example high speed spindles, are used where the objective is achieving high chip production.

SUMMARY OF THE INVENTION

The machine tool of the present invention has at least two tong-shaped grippers. The legs of the grippers are formed for engaging a ring groove at the broad end of a tool taper. The machine tool also has a carrier that is rotatable about its central axis by a motor. The grippers are mounted symmetrically on opposing sides of the central axis with the legs pointing outward. The machine tool further has a support structure for the carrier. The support structure has a drive for moving the carrier.

It is one object of the invention to further shorten the time required for a tool change by using relatively technically simple means. The invention achieves this object by having at least one leg of the tong-shaped grippers of the tool changer extended to form a protruding holding finger.

According to one embodiment of the invention, the time required for engagement of the tong-shaped gripper with the ring groove on the tool taper, and the time required for releasing the tool taper from its spindle holding fixture, are shortened. This is because the collet chuck fastening the tool taper can be released more quickly than in conventional grippers. In conventional grippers the collet chuck fastening the tool taper in its conical spindle holding fixture could only be released after the tong-shaped gripper had fully engaged with the ring groove in the tool taper. These devices do not allow the release of the collet chuck any sooner because a suitable engagement of the tong-shaped grippers with the ring groove was not ensured because of the release of the tool taper was already initiated.

In the present invention, at least one of the two gripper legs is extended to form a protruding holding finger. The profile of the holding finger is adapted to the cross-section of the ring groove. The holding finger already slides into the ring groove of the tool taper during the lateral gripping movement. In this position it is still tightly fastened, thus retaining the tool taper in the conical holding fixture. This allows an earlier release of the collet chuck while the gripper is still being moved toward the tool. In other words, both processes of releasing the collet chuck and gripping by the tong-shaped gripper, overlap in time, at least in part. This leads to a shortening of the total time required for both processes. While the time saving per tool change process is relatively small, within the range of about a few tenths of a second up to about 1 to 2 seconds, the possible chipping times of a machine are extended in industrial scale manufacturing. This is achieved by the technically very simple measure of extending a gripper leg.

If the tool changes are executed on a machine by a linear movement of either the work spindle or the tool changer, with the gripper being pushed laterally into the receiving or holding groove of the tool taper, the protruding holding finger is formed in a straight manner on one of the gripper legs.

It is also contemplated that engagement of the gripper with the groove of the tool taper will be performed at the end of a rotary movement of the gripper. In this case, the protruding holding finger formed on one leg of the gripper is in the form of a curve, preferably a circular curve. It is formed such that the finger at the end of a circularly curved motion track engages with the receiving groove of the tool taper before the attachment is completed. Even in this case the collet chuck integrated in the work spindle can be released sooner because the tool taper with the tool is held by the holding finger engaging the ring groove until the subsequent complete engagement of the gripper. In such change processes a similar safety effect is achieved if at least one leg of the gripper gradually changes into a curved holding element extending in front of the respective gripper leg and having the same securing and holding function, as the above-mentioned holding finger. This holding segment is in a suitable form of a circular segment and attached to the carrier.

The securing effect achieved herein during a tool change is also obtained by the gripper legs. These are preferably rigid, such that they are not movable in opposite directions. It is preferred to have a securing holder at the transfer point between the holding finger and the holding segment, and the inner space of the gripper. It preferably is configured as a protruding spring-biased holding member that allows the gripper to engage with the groove of the tool taper, for example with a spring bias, and returns to its above-mentioned securing position due to a spring effect after the engagement has been made.

A tool changer according to a further embodiment of the invention has four grippers diametrically opposed in pairs on a single carrier. It provides a further accelerated tool change whereby tools to be exchanged can be held in a standby position and only a rotary movement of 90° is required for changing or exchanging a tool.

Further advantages and details of the tool changer according to the invention can be taken from the following description of an embodiment with reference to the drawing wherein a machine tool is schematically illustrated with the tool changer formed according to the invention.

BRIEF DESCRIPTION OF THE DRAWING

Further particularities and advantages of the invention will become clear from the following description of preferred embodiments with reference to the drawing, in which:

FIG. 2 is a perspective view of an alternate embodiment of the tool changer according to the invention;

FIG. 3 is a perspective view of another alternate embodiment of the tool changer according to the invention; and FIG. 4 is a perspective view of yet another alternate embodiment of the tool changer according to the invention.

DETAILED DESCRIPTION OF THE PREFERRED EMBODIMENTS

Figure 1:
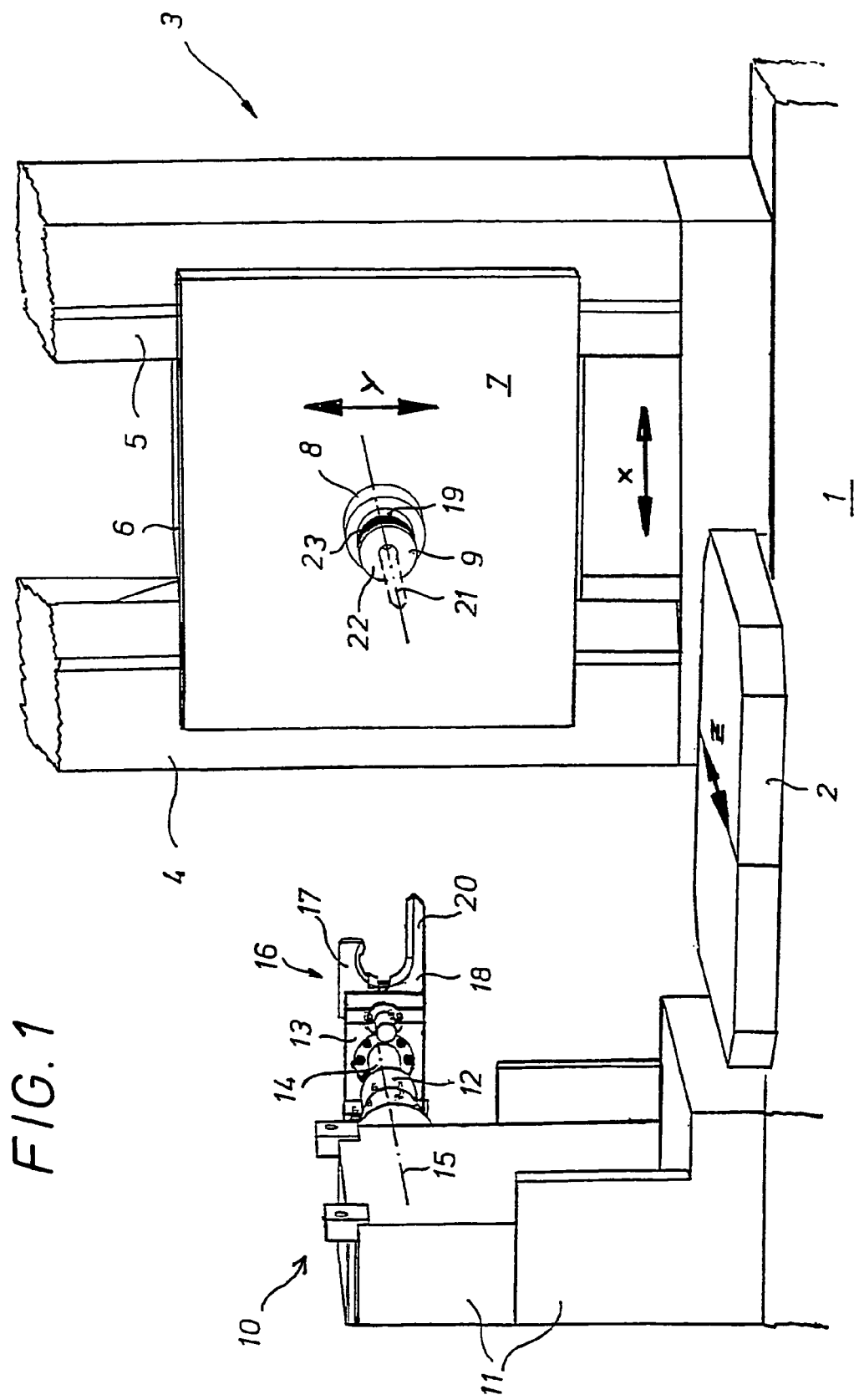
FIG. 1 is a perspective view of a machine tool with a tool changer according to one embodiment of the invention.

The machine tool schematically shown in FIG. 1 is a horizontal machining center designed for industrial scale manufacture. It has highly rigid bed 1 as a carrier of work table 2. The work table can travel in the direction of the two-tip arrow (z-coordinate axis). Furthermore, the machine has base 3, which can travel in the direction of the two-tip arrow (x-coordinate axis). Two vertical pillars 4 and 5 are firmly connected by an upper cross head (not shown). In the gap between pillars 4 and 5, carriage 6 is disposed and is movable in the direction of the two-tip arrow (y-coordinate axis). It has front cover 7 and carries spindle head 8 of horizontal work spindle 9.

FIG. 1 shows tool changer 10 adjacent to the illustrated basic components of the machine tool. The tool changer has stationary substructure 11 and support structure 12 for carrier 13. As shown, the support structure has telescopic arm 14 extendable and retractable in the direction of its longitudinal axis 15 by means of, for example, a pressure medium cylinder (not shown). On the free end of this telescopic arm, carrier 13, which is in the form of a plate structure, is transversely mounted. Tong-shaped gripper 16 is at each of the two opposing sides, with only the right-hand side gripper being shown in the drawing. Each gripper 16 has two opposing legs 17 and 18. At least leg 17 is flexibly supported for engagement and can execute a slight opening movement when gripping ring groove 23 in outer collar 22 of standardized tool taper 19. Leg 17 is lockable in its holding position for securely holding tool taper 19. Leg 18, which is the lower one in the drawing, is extended to form protruding holding finger 20. This holding finger displays a profile adapted to the cross-section of the ring groove in the collar of the tool taper.

In one embodiment of the invention a tool change is performed as follows. Base 3 travels in the direction of the x-coordinate axis after a machining process with drilling tool 21. At the same time, vertical carriage 6 travels in the direction of the y-coordinate axis. Thus, the central axis of the work spindle is in a horizontal plane, where the central axis of gripper 16 is also located. Shortly before the end of the horizontal movement of travelling base 3, extended holding finger 20 of gripper 16 engages with ring groove 23 formed in outer collar 22 of tool taper 19. Since holding finger 20 is rigid, tool taper 19 is retained safely and free of rocking. Immediately afterward, and before the full engagement of legs 17 and 18 of gripper 16, the release process of the collet chuck arranged inside work spindle 9 can be effected.

As soon as tool taper 19 has been gripped by tong-shaped gripper 16, with upper leg 17 unlocked, and this upper leg has been fixed in its gripping position by the lock, a retracting movement of telescopic arm 14 occurs. This is in order to pull out tool taper 19 previously released by the collet chuck from the conical holding fixture (not shown) on the inside of the spindle. Then carrier 13 is rotated by 180° around axis 15 such that the gripper equipped with the new tool arrives at the transfer position of the previous gripper. The insertion of the new tool with its tool taper into the holding fixture of work spindle 9 is performed, while the fastening of the tool taper in its holding fixture by the collet chuck can be effected at an earlier point in time. In other words, this can happen at the beginning of the horizontal pull-off movement by moving base 3 because the new tool with tool taper 19 will also be maintained in ring groove 23 by the extended engagement of holding finger 20.

The embodiments of the tool changers shown in FIGS. 2 to 4 are designed for use in the machine tool according to FIG. 1. However, the tool changers according to FIGS. 1 to 4 can also be used in other machine tools and machining centers. In the following description components corresponding to the tool changer of FIG. 1 are indicated by the same reference numerals. In the embodiments illustrated in FIGS. 2 to 4 the tool transfer from the magazine to the tool changer, and from the tool changer to the work spindle is carried out each time by a rotary movement of carrier 13 around longitudinal axis 15. The transfer is not, as in the embodiment of FIG. 1, by a translatory linear movement of work spindle 9.

The embodiment of FIG. 2 generally corresponds to the tool changer described above with reference to FIG. 1. The formation of two grippers 26 is different, which have radially outer gripper leg 25 having extended rigid holding finger 27. An equally circularly curved guiding bracket 28 is on the circularly curved inner surface of the holding finger. The radius of curvature of the guiding bracket is adapted to the rotational motion around rotary axis 15 so that the guiding bracket engages with the ring groove in collar 22 of tool taper 19. It is engaged so as to be collision-free during a rotary movement of carrier 13. The securing effect of holding finger 27 corresponds to that of straight holding finger 20 of the FIG. 1 embodiment. Another difference of grippers 26 as compared to the embodiment of FIG. 1 is that both gripper legs 24 and 25 are rigid. They are not movable in opposite directions, which achieves a less complex structure. In order to secure the position of gripped tool taper 19 in the respective gripper, securing holder 29 is provided on each radially inner leg 24. The securing holder consists of a projecting spring-biased roller which is pushed back against the spring tension in an insertion process and automatically returns to its protruding illustrated position as soon as the tool taper is fully located in the gripper. An electric switch (not shown) can connect this securing holder to the program control and the emergency stop of the machine tool in order to shut down the machine in case of an incomplete engagement. Instead of the rollers as shown, other suitable elements such as ramps movable against spring tension may be used as a securing holder.

Instead of the extended holding fingers 20 and 27 of the embodiments of FIGS. 1 and 2, respectively, the embodiment of FIG. 3 may contain curved holding segment 30 for each gripper, thereby forming the continuation of radially inner gripper leg 32. In this embodiment, both gripper legs 17 and 32 are fixed against each other. Guiding bracket 31 is located on each holding segment 30, which engages with ring groove 23 in collar 22 of tool taper 19. It provides guiding and holding functions before tool taper 19 is fully gripped by gripper 17. This is similar to extended fingers 20 and 27 in a previous embodiment.

The tool changer shown in FIG. 4 differs from the embodiment of FIG. 3 only in the provision of a total of four grippers, which are mounted on carrier 13 diametrically opposed in pairs, for example, offset against each other by right angles. As can be seen, the structural formation of four grippers 17 otherwise corresponds to the above-mentioned embodiment of FIG. 3.

The tool changers described above can be used in various machine tools, with structural and functional modifications for adaptation to each machine being possible. As shown, various features of the above-mentioned changer embodiments can be used in other tool changers. For example, the provision of holding finger 27 on two or all four grippers of the embodiment of FIG. 4 is possible.

The invention is not limited to the illustrated embodiment described above. On the contrary, the tool changer formed according to the invention can be used in very different types of machine tools where extremely short changing times are important. These also include machine tools, for example, in which the movements necessary for changing a tool are carried out by the tool changer.

What is claimed is:

1. A tool changer for a machine tool, said tool changer comprising:
   at least two tong-shaped grippers, said grippers comprising at least two legs configured engagement with a ring groove at a broad end of the taper of a tool, at least one of said legs being extended and being substantially longer than the other said leg to form a protruding holding finger to prevent the tool from dislodgement from the machine tool when released by the machine tool and prior to secure engagement of the tool by the tool changer;
   a carrier rotatable about a central axis, said carrier having said grippers mounted symmetrically thereon on the opposing sides of the central axis with the legs pointing outward; and
   a support structure for the carrier, said support structure comprising a drive for moving the carrier in an axis parallel to the axis of a work spindle.

2. The tool changer according to claim 1, wherein the work spindle can travel in a horizontal direction across the longitudinal axis of the spindle for lateral engagement of the gripper.

3. The tool changer according to claim 1, wherein the protruding holding finger is curved at least at its radial inner area and further comprises a curved holding and guiding bracket.

4. The tool changer according to claim 1, wherein one leg of the grippers curves gradually into a curved holding segment carrying a guiding bracket on its curved surface.

5. The tool changer according to claim 4, wherein the holding segment of the gripper is mounted on the carrier.

6. The tool changer according to claim 5, wherein the two legs of the grippers are rigid and a securing holder is provided at least on one leg.

7. The tool changer according to claim 6, wherein the securing holder comprises a projecting spring-biased holding member.

8. The tool changer according to claim 7, wherein four grippers are arranged in pairs diametrically opposed on the carrier.

9. The tool changer according to claim 1, wherein said legs of said grippers have an open position and a holding position, at least one of said at least two legs is movable to the open position and is lockable in the holding position for securely holding the tool.

10. A method for changing a tool out of a machine tool, the method comprising: rotating a rotatable tool changer into position to engage a spent tool in the machine tool, the tool changer having at least two tong-shaped grippers, each comprised of at least two legs, at least one of said legs being substantially longer than the other said leg;
   holding the tool in place in the machine tool by means of the longer leg after release of the tool by the machine tool and prior to secure engagement of the tool by the tool changer;
   securely engaging the tool by the tool changer;
   locking the at least two legs onto the tool; and
   removing the tool from the machine tool.

* * * * *

UNITED STATES PATENT AND TRADEMARK OFFICE
CERTIFICATE OF CORRECTION

PATENT NO. : 7,104,940 B2  Page 1 of 1
APPLICATION NO. : 10/489127
DATED : September 12, 2006
INVENTOR(S) : Kurt Kessler It is certified that error appears in the above-identified patent and that said Letters Patent is hereby corrected as shown below:

On the title page, item [73]:
Please change Assignee name to read as follows:

-- DECKEL MAHO Geretsried GmbH--

Signed and Sealed this

Nineteenth Day of December, 2006

JON W. DUDAS
*Director of the United States Patent and Trademark Office*